United States Patent Office 3,268,450
Patented August 23, 1966

3,268,450
COMPOSITIONS CONTAINING AMINOMETHANE PHOSPHONATE COPOLYMERS
Homer J. Sims, Horsham, La Verne N. Bauer, Cheltenham, and Albert F. Preuss, Jr., Willow Grove, Pa., assignors to Rohm & Haas Company, Philadelphia, Pa., a corporation of Delaware
No Drawing. Filed June 1, 1965, Ser. No. 460,572
18 Claims. (Cl. 252—49.9)

This application is a continuation-in-part of application Serial No. 280,733, filed May 15, 1963, now abandoned.

This invention deals with lubricating and fuel compositions. It further deals with lubricating oils and fuels containing copolymers of specific aminomethane phosphates. It further deals with lubricating oil compositions containing specific aminomethane phosphonate copolymers which impart dispersant properties, pour-point depressing action and improvements in viscosity. It further deals with lubricating compositions containing specific aminomethane phosphonate copolymers which impart anti-rust and dispersant action. It also deals with fuel compositions containing specific aminomethane phosphonate copolymers which impart excellent dispersant activity.

The specific aminomethane phosphonates employed in the copolymers of this invention may be represented by the formula

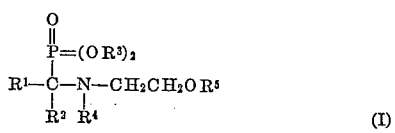

in which
$R^1$ and $R^2$ represent hydrogen or alkyl groups of 1 to 8 carbon atoms,
$R^3$ represents an alkyl or chloroalkyl group of 1 to 8 carbon atoms, a phenyl or chlorophenyl group or a benzyl or chlorobenzyl group,
$R^4$ represents hydrogen or a tert-alkyl group of 4 to 24 carbon atoms and
$R^5$ is a vinyl, acryloyl or methacryloyl group.

Typically, $R^1$ and $R^2$ may represent hydrogen, methyl, ethyl, butyl, hexyl or octyl. Both $R^1$ and $R^2$ can be hydrogen or alkyl at the same time or a combination, as desired. A particularly interesting series of compounds is obtained when $R^1$ and $R^2$ both represent hydrogen and $R^4$ is tert-alkyl.

$R^4$ may represent hydrogen, tert-butyl, tert-octyl, tert-dodecyl, tert-tridecyl, tert-octadecyl and tert-tetraeicosyl. Both the hydrogen and tert-alkyl embodiments provide interesting and effective compounds within the spirit of this invention.

These aminomethane phosphonates are prepared by reacting on a substantially equimolecular basis, the compounds having the formulas

and

In the present reaction, it is possible to add all three of the above embodiments substantially simultaneously or add (II) and (III) together and then follow with (IV).

It is probable that (II) and (III) react to form an intermediate which, on reaction with (IV), forms the product of this invention with the liberation of water. When $R^4$ represents hydrogen and if $R^1$ or $R^2$ or both are alkyl, (II) and (III) react to form an imine. In such a circumstance, the imine may be separated from the reaction mixture, which is frequently desirable, or simply reacted with reactant (IV). Water is a by-product of the present reaction and is usually conveniently removed azeotropically as the reaction progresses by the use of any solvent that will form an azeotrope with water, such as benzene, toluene and the like.

This reaction is somewhat exothermic in nature but heat is generally supplied in order to accelerate the reaction and maximize yields. Temperatures in the range of about 25° to 100° C., preferably 50° to 80° C., are employed.

It is preferred to conduct the reaction in the presence of an inert, volatile, organic solvent, such as benzene, toluene, or the like, as mentioned previously, in order to aid in the azeotropic removal of water formed during the course of the reaction.

The reaction is continued until the theoretical amount of water has been liberated. Any remaining solvent is then removed by distillation, preferably at reduced pressures. The products are obtained in high yields, consistently in excess of 80%, and in a good state of purity.

Typical of the number (II) reactants are formaldehyde, acetaldehyde, propanal, butanal, hexanal, octanal, acetone, propanone, butanone, 2-pentanone, 3-pentanone, 2-hexanone, 2-heptanone, 3-heptanone, 4-heptanone, 2-octanone, and 4-octanone.

Typical of the number (III) reactants include tert-dodecylaminoethyl methacrylate, tert-octylaminoethyl methacrylate, tert-butylaminoethyl methacrylate, tert-tridecylaminoethyl methacrylate, tert-butylaminoethyl acrylate, tert-octylaminoethyl acrylate, tert-dodecylaminoethyl acrylate, tert-tridecylaminoethyl acrylate, tert-octadecylaminoethyl acrylate, tert-eicosylaminoethyl acrylate and β-aminoethyl vinyl ether.

Typical of the number (IV) reactants include dimethyl phosphite, diethyl phosphite, dibutyl phosphite, dioctyl phosphite, di (chloroethyl)phosphite, di (chlorobutyl)-phosphite, di(chlorooctyl)phosphite, diphenyl phosphite, di(chlorophenyl)phosphite, dibenzyl phosphite, ditoluyl phosphite and di(chlorobenzyl)phosphite.

The preferred reactants are formaldehyde, tert-alkylaminoethyl methacrylate, wherein the tert-alkyl is dodecyl, tridecyl or octadecyl, and methyl or ethyl phosphite.

The aforementioned aminomethane phosphonates may be copolymerized with monoethylenically unsaturated polymerizable monomers.

Suitable as comonomers are alkyl and aryl acrylates in which the alkyl or aryl portion contains preferably 1 to 24 carbon atoms; alkyl and aryl methacrylates in which the alkyl or aryl portion contains preferably 1 to 24 carbon atoms; acrylonitrile; methacrylonitrile; alkylaminoalkyl and dialkylaminoalkyl acrylates and methacrylates; acrylamide and methacrylamide and their N-alkyl substituted derivatives; styrene and alkyl ring substituted styrenes containing no more than a total of about 20 carbon atoms; α-methylstyrene; allyl esters in which the carboxylate portion contains preferably 2 to 18 carbon atoms; vinyl esters in which the carboxylate portion contains 1 to 18 carton atoms, including the carbon of the carboxylate functions; vinyl alkyl ethers and vinyl alkyl sulfides in which the alkyl portion contains no more than 18 carbon atoms and N-vinyl lactams, preferably containing from 6 to 20 carbon atoms; a compound having the formula

in which

A is an alkylene group of 3 to 12 carbon atoms having 3 to 5 carbon atoms in a chain between the nitrogen and the carbonyl carbon atom, X is hydrogen or methyl, x has a value of 1 to 4, and n has a value of 1 to 4, such as N-(acryloxyalkyl)-oxazinidinones containing 4 to 6 carbon atoms in the cyclic structure, N-(methacryloxyalkyl)-oxazinidinones, N - (acryloxyalkyl)-pyrrolidinones, N - (methacryloxyalkyl)pyrrolidinones; alkyl vinyl sulfones in which the alkyl portion contains up to about 18 carbon atoms; N-vinyl-alkyleneureas containing from 5 to 12 carbon atoms; olefins such as isobutylene, dialkyl fumarates of up to 24 carbon atoms in each alkyl portion of the molecule; dialkyl maleates of up to 24 carbon atoms in each alkyl portion of the molecule; dialkyl itaconates of up to 24 carbon atoms in each alkyl portion of the molecule; and vinylpyridines or lower alkyl substituted vinylpyridines. In the above monomers, the alkyl groups may exhibit any possible spatial configurations, such as normal, iso or tertiary, although normal alkyl groups may be acyclic or cyclic, including alkyl substituted cyclic, as long as the size of alkyl groups or the average size of alkyl groups in a mixture of polymerizable monomers is selected to ensure solubility of the final copolymer in oil in which it is to be used at the desired concentration. In the ring substituted styrenes, the substituents may occupy any possible ring location or locations and when the substituents are alkyl groups, they may have any possible spatial configuration.

Typical of the above monomers that may be employed are

Methyl acrylate,
Ethyl acrylate,
Octyl acrylate,
Isopropyl acrylate,
Cyclopentyl acrylate,
2-ethylhexyl acrylate,
Decyl acrylate,
Isodecyl acrylate,
Dodecyl acrylate,
Tridecyl acrylate,
Octodecyl acrylate,
Methyl methacrylate,
Ethyl methacrylate,
n-Butyl methacrylate,
Tert-butyl methacrylate,
δ-Chlorobutyl methacrylate,
Cyclohexyl methacrylate,
Octyl methacrylate,
Isodecyl methacrylate,
Phenyl methacrylate,
Benzyl methacrylate,
Dimethylaminoethyl methacrylate,
Methoxyethoxyethyl methacrylate,
Methoxypolyethylene glycol methacrylate of about 425 to 818 in molecular weight,
Methoxyisopropoxyisopropyl methacrylate,
Dodecyl polyethylene glycol methacrylate with sufficient ethylene oxide units therein to give a molecular weight of about 1706,
Tert-butylaminoethyl methacrylate,
Tert-dodecylaminoethyl acrylate,
Octadecyl methacrylate,
Behenyl methacrylate,
Tetracosyl methacrylate,
Acrylonitrile,
Methacrylonitrile,
2-(ethylsulfinyl)-ethyl methacrylate,
N,N-dibutyl acrylamide, acrylamide,
N-methylacrylamide,
N-butyl methacrylamide,
Dimethylaminopropyl methacrylamide,
N-tert-octylacrylamide, styrene,
p-Butylstyrene,
p-Octylstyrene,
o-Chlorostyrene,
o,p-Dipropylstyrene,
p-Cyanostyrene,
o-Methyl-p-decylstyrene,
N-vinylsuccinimide,
Formamidoethyl vinyl ether,
Butanamidodecyl vinyl ether,
Acetamidooctadecyl vinyl ether,
Ureidoethyl vinyl ether,
Butyl vinyl sulfide,
Octyl vinyl sulfide,
Octadecyl vinyl sulfide,
Dimethylaminoethyl vinyl sulfide,
Diethylaminodecyl vinyl sulfide,
Morpholinopentyl vinyl sulfide,
Pyrrolidinyloctyl vinyl sulfide,
Piperidinodecyl vinyl sulfide,
N-vinyl-2-pyrrolidinone,
N-vinyl-5-methyl-2-pyrrolidinone,
N-vinyl-3-methyl-2-pyrrolidinone,
N-vinyl-4,4-diethyl-2-pyrrolidinone,
N-vinyl-4-butyl-5-octyl-2-pyrrolidinone,
N-(2-methacryloxyethyl)-2-pyrrolidinone,
N-(3-methacryloxypropyl)-2-pyrrolidinone,
N-vinyl-6-methyl-2-piperidone,
N-vinyl-6-octyl-2-piperidone,
N-vinyl-2,2,6,6-tetramethyl-4-piperidone,
N-vinyl-2-oxazinidinone,
N-vinyl-2-oxazolidinone,
N-vinyl-5-ethyl-2-oxazolidinone,
N-vinyl-5-methyl-2-oxazolidinone,
N-(2-methacryloxyethyl)-2-oxazolidinone,
N-vinyl-3-morpholinone,
N-vinyl-2-oxohexamethylenimine,
N-vinyl-5,5-dimethyl-2-oxohexamethylenimine,
N-vinyl-4-butyl-5-octyl-2-oxohexamethylenimine,
methyl vinyl sulfone,
isobutyl vinyl sulfone,
tert-octyl vinyl sulfone,
dodecyl vinyl sulfone,
octadecyl vinyl sulfone,
N-vinylethyleneurea,
N-vinyltrimethyleneurea,
N-vinyl-1,2-propyleneurea,
N-vinylbutyleneurea,
N-vinyl-N'-dibutylaminododecylethyleneurea,
isobutylene,
N-vinylcarbazole,
vinyl acetate,
vinyl stearate,
dimethyl maleate,
dioctyl maleate,
dimethyl itaconate,
dibutyl itaconate,
dihexyl itaconate,
dimethyl fumarate,
diethyl fumarate,
dioctyl fumarate,
dibutyl fumarate,
diisodecyl fumarate,
didodecyl fumarate,
dibutyl maleate,
dihexyl maleate,
didecyl maleate,
diethyl itaconate,
dioctyl itaconate,
ditridecyl itaconate,
didodecyl itaconate,
distearyl itaconate, and
2-methyl-5-vinylpyridine or 2-vinylpyridine.

It is understood that in many cases it will be preferred to combine more than one of the above comonomers with the aminoethane phosphonate monomer or monomers, as for example, dodecyl methacrylate and styrene, in order to achieve various modifications and properties in the product contemplated. It is, of course, necessary for the present purposes that the copolymers have oil solubility and, as will be apparent to one skilled in the art, the comonomers should be selected in order to impart this oil solubility.

Typical monomers that impart oil solubility include acrylates, methacrylates, itaconates, fumarates and maleates, in which the alcohol residue contains 6 to 24 carbon atoms. Particularly useful in this respect are octyl, nonyl, dodecyl, isodecyl, isononyl, tridecyl, tetradecyl, octadecyl, phenyl, benzyl, cyclohexyl and alkylphenyl acrylates and methacrylates, itaconates, maleates and fumarates.

Another useful type of starting material comprises vinyl esters of monocarboxylic acids. Here, oil solubility can be controlled by the size of the hydrocarbon portion of the acid residue. If such ester or mixture of such esters is used to form the copolymer, it is usually desirable that the average group size be at least 8 carbon atoms.

There may also be employed with the monomers, mentioned above, for the final copolymer, minor proportions of other monomers, such as acrylic, methacrylic or itaconic acid, maleic anhydride, half esters of maleic, fumaric or itaconic acid, acrylamide, N-substituted acrylamides, methacrylamide, N-substituted methacrylamides, acrylonitrile, methacrylonitrile, vinyl esters of lower monocarboxylic acids, vinyl ethers, vinyl thioethers, vinyl ketones, vinyl chloride and vinylidene chloride.

It is preferred to employ the specific aminomethane phosphonate monomers of the present invention with an alkyl ($C_1$–$C_{18}$) methacrylate, alkyl ($C_1$–$C_{18}$) acrylate, dialkyl ($C_1$–$C_{18}$) fumarate, dialkyl ($C_2$–$C_{18}$) maleates, dialkyl ($C_1$–$C_{18}$) itaconates or vinyl esters. While in most instances the copolymers of the present invention are prepared from a specific aminomethane phosphonate compound, with one of the other listed monomers, it is quite satisfactory for many uses to employ additional monomers, as desired, in order to arrive at desired properties in the final product.

The copolymers of the present invention may be prepared in a wide range of percentages. The valuable properties, described hereinbefore, are observed when as little as 0.5% by weight of the aminomethane phosphonate monomer is employed, although it is generally preferable to use about 2%, or more, of this monomer.

Polymerization may be carried out in bulk when the monomers are liquids or low-melting solids, in solution or in either suspension or emulsion. In bulk and solution polymerization, the reaction may be carried out without catalyst, initiated with light and heat, but it is preferred to use one or more of the peroxide or azo initiators which act as free radical catalysts, and are effective between 30° and 150° C. These may be employed in amounts of 0.01 to 10%, or more, by weight, preferably 0.05 to 2.5% by weight. Typical initiators include benzoyl peroxide, tert-butyl peroxide, acetyl peroxide, capryl peroxide, tert-butyl hydroperoxide, cumene hydroperoxide, tert-butyl perbenzoate, diisopropylbenzene hydroperoxide, triisopropylbenzene hydroperoxide, methyl cyclohexane hydroperoxide, di-tert-butyl peroxide, methylethyl ketone peroxide, azodiisobutyronitrile, azodiisobutyramide, dimethyl, diethyl or dibutyl azodiisobutyrate, azobis($\alpha,\gamma$ - dimethylvaleronitrile), azobis($\alpha$ - methylbutyronitrile, azobis($\alpha$-mehtyl-valeronitrile), dimethyl or diethyl azobis-$\alpha$-methylvalerate and the like.

In conjunction with a hydroperoxide, it is desirable, but not absolutely essential, to supply an activator. Its effect seems, at least in part, to provide free radicals at somewhat lower temperatures than are effective for free radical formation from hydroperoxides in the absence of such activator.

Especially effective as activators are quaternary ammonium compounds. Typical compounds of this sort are benzyltrimethylammonium chloride,
dibenzyldimethylammonium bromide,
butyldimethylbenzylammonium chloride,
octyltrimethylammonium chloride,
dodecyldimethylbenzylammonium chloride,
nonylbenzyltrimethylammonium chloride,
dodecylbenzyldimethylbenzylammonium chloride,
didodecenyldimethylammonium chloride,
benzyldimethyldodecenylammonium chloride,
octylphenoxyethyldimethylbenzylammonium chloride,
diisobutylphenoxyethoxyethyldimethylbenzylammonium chloride,
octylpyridinium chloride,
N-octyl-N-methylmorpholinium chloride or bis-quaternary salts, such as those having quaternary nitrogens linked with an alkylene group, an ether group or an amide-containing group.

The amount of activator is proportioned to the amount of hydroperoxide. Usually, the proportion of quaternary ammonium compound will be from 5 to 40% of the weight of the hydroperoxide.

Solution polymerization may be carried out in kerosene, mineral oils, diesters, such as di(2-ethylhexyl)adipate or sebacate, chlorinated hydrocarbons, such as chloroform or ethylene chloride, tributylphosphate, dibutyl phenyl phosphate, silicate esters or silicone fluids, benzene, toluene, xylene, solvent naphthas, dioxane, diisobutyl ketone, acetonitrile, dimethyl formamide, tert-butyl alcohol and the like, depending on the solubilities of the monomers it is desired to use.

Emulsion polymerization is particularly effective with those members of the aminomethane phosphonate monomer series which have low solubilities in water. There may be used in forming the emulsion non-ionic or cationic emulsifiers, such as dodecyldimethylbenzyl ammonium chloride, dodecylbenzyltrimethylammonium chloride, cetylpyridinium chloride, alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols and the like; polyethoxyethanol derivatives of methylenelinked alkyl phenols; sulfur-containing agents, such as those made by condensing 6 to 60 or more moles of ethylene oxide with nonyl, dodecyl, tetradecyl, tert-dodecyl and the like, mercaptans or with alkylthiophenols having alkyl groups of 6 to 15 carbon atoms; ethylene oxide derivatives of long-chained carboxylic acids, such as lauric, myristic, palmitic, oleic and the like or mixtures of acids, such as found in tall oil, containing 6 to 60 oxyethylene units per molecule; analogous ethylene oxide condensates of long-chained alcohols, such as octyl, decyl, lauryl or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also, ethylene oxide condensates of long-chain or branched-chain amines, such as dodecylamine, hexadecylamine and octadecylamine, containing 6 to 60 oxyethylene groups, block copolymers of ethylene oxide and propylene oxide comprising a hydrophobic propylene oxide section combined with one or more hydrophilic ethylene oxide sections.

In the case of emulsion polymerization especially, a redox catalyst system is extremely effective. This includes the use of an organic peroxide, such as benzoyl peroxide, acetyl peroxide, capryl peroxide and the like, or an inorganic peroxide, such as hydrogen peroxide, ammonium persulfate, sodium persulfate, potassium persulfate or the like. The peroxidic catalyst is effectively coupled with a reducing agent, such as a sulfite, bisulfite, metasulfite or hydrosulfite of ammonium, sodium, potassium or the like.

Polymerization may also be initiated by high-energy irradiation. Suitable sources of high-energy irradiation are radioactive materials and electron accelerators. Useful as radioactive materials that supply gamma rays are irradiated isotopes, such as $Co^{60}$, fission products, such as $Cs^{137}$, adjuncts to fission reactants, such as radioactive xenon and the like. A $Co^{60}$ source is particularly effective. Useful as radioactive materials that supply beta rays are $Sr^{90}$ and the like. Valuable as electron accelerators, which supply beta rays, are the Van de Graaff generator, the resonant transformer and the like. Dosages in the range of 10,000 to 10,000,000 rep.'s, preferably 500,000 to 2,000,000 rep.'s, are employed. A rep.'s is equivalent to the ionization produced by the absorption of 93 ergs of energy per gram of irradiated substance. Rep.'s stands for roentgen-equivalent-physical and is a unit of intensity and time.

The copolymerization of the monomers, described hereinbefore, may be conducted by mixing all of the monomers to be used at substantially the same time or one of the comonomers may be partially polymerized and then another comonomer or comonomers may be added at a later time, either all at once or incrementally. The copolymer of the aminomethane phosphonate monomer may also be prepared as a graft copolymer by carrying out the polymerization of the oil-solubilizing portion of the copolymer to about 40 to 90%, then adding the aminomethane phosphonate monomer either alone or in combination with another monovinylidene polymerizable monomer, preferably but not necessarily, in the presence of a free-radical catalyst. The initiator and activator may be employed by incremental addition from time to time or all at once, as desired. Generally, the incremental addition is preferred.

The final copolymer may be taken up in a liquid, such as a petroleum oil or synthetic lubricant, and a concentrate prepared in the range of about 10 to 60% of the copolymer. Volatile solvent and monomer may be volatilized from the mixture of copolymer and oil or synthetic lubricant. The concentrate is convenient for handling, stripping and blending.

Copolymers may be prepared over a wide range of molecular weight by variations in temperature, time, catalyst and particular monomers contemplated. Molecular weights, as determined by viscosity methods, generally range from about 20,000 to 2,000,000, or more. Low molecular weights are especially desirable when the polymers are to be resistant to shear. The high molecular weight polymers are desired when maximum thickening and other optimum properties are required.

For purposes of determining the extent of copolymerization, there may conveniently be used a simple method which comprises isolating the copolymer from the reaction mixture, as by removal of a volatile solvent. Estimation of the extent of formation of the copolymer is particularly desirable in establishing the proper time of copolymerization for a given system in which proportions of initiator, concentrations and temperatures are fixed.

In one useful form of test for extent of copolymerization, a 1-gram sample of copolymerizing mixture is taken and dissolved in 5 ml. of benzene. The resulting solution is mixed with 15 ml. of methanol. Copolymer precipitates and is separated by centrifuging.

For purposes of determining the dispersancy characteristics of oil blends of the copolymer, a modified asphaltene bench test, known as the Shell Wood River Detergency Test, as described by S. K. Talley and R. G. Larsen in Industrial & Engineering Chemistry, Analytical Edition, 15, 91–95 (1943), was used.

The asphaltenes reagent used for these dispersion comparisons consists of the chloroform soluble, n-pentane insoluble material extracted from air oxidized napthenic oil (refrigerator oil) (72 hours at 175° C.). A trace of iron naphthenate is added as oxidation catalyst to the oil. The asphaltenes solution is finally adjusted to contain 2% solids in chloroform. The test consists in simply adding this reagent from a burette (usually 2 ml. per 10 ml. blend) to the test blend in a test tube and evaporating off the chloroform in forced draft oven at 150° C. for two hours. In most cases, 90° C. is used. After cooling the tubes for 30 to 45 minutes, examination for separation of sludge is made with the aid of a flashlight and by tilting the tubes.

The oil test blend is considered passing the asphaltenes test provided a majority of the asphaltenes sludge remains suspended.

The compositions of the present invention include in a lubricating base from about 0.1 to 10%, preferably 0.2 to 2.0%, by weight, of a copolymer, described hereinbefore, in a lubricating oil, automatic transmission fluid, hydraulic fluid, gear oil or grease. There may be used one or more other additives, such as anti-oxidants, anti-foam agents, anti-rust agents, anti-wear agents, heavy-duty detergents, pour point depressants, viscosity index improvers or other type of additive. For example, one or more of the dithiophosphates, such as zinc dialkyl dithiophosphate, sulfurized oils, phenol sulfonates or alkylaryl sulfonates or petroleum sulfonates, whether normal or with alkaline reserve, polymers and copolymers from alkyl acrylates, methacrylates, itaconates, or fumarates or vinyl carboxylates and mixtures thereof; polybutenes, various silicones, alkyl or aryl phosphates or many other oil additives may be present.

While a pour-point depressant and a viscosity index improver may be added, in addition to a copolymer of this invention, there may be used in place of such separate additives a copolymer of this invention which supplies not only dispersant action, but also one or both of these other actions. Thus, a copolymer which contains some alkyl groups of 16 or more carbon atoms, particularly cetyl or stearyl, together with smaller groups, such as n-butyl, lauryl or octyl, will lower the pour point of oils having a waxy pour point and, at the same time, improve temperature-viscosity relationships. Improvements in viscosity index can be emphasized by the choice of substituents and such improvements can be had without lowering of pour point, if this is desired. The lubricating oils contemplated include both the mineral and synthetic types.

A turbo prop lubricant may be prepared by blending the copolymers of this invention with di-(2-ethylhexyl)-sebacate and a mixture of polyesters formed by condensing 2-ethyl-1,3-hexanediol and sebacic acid into the polyesters with 2-ethylhexanol, there being an average of about three glycol units per molecule. This composition may also contain antioxidant, stabilizer or other usual additive.

Copolymers of this invention may also be used in a fuel base of various types, including furnace oils, kerosene, gasolines and jet fuels. Concentrations of copolymers from about 0.001 to 0.1% by weight are usually sufficient to disperse gum or resins which may form during storage, thereby preventing deposits of gum and resins on the walls of containers or pipes or on screens.

The polymers of the present invention are valuable as anti-rust additives for lubricating oil and distillate fuels, as anti-rust additives for gasolines, as anti-wear additives for lubricating oils, or as anti-rust additives for jet fuels. It is to be construed that lubricating oil means both mineral and synthetic. The compounds of the present invention impart the above-enumerated qualities to lubricating oils and distillate fuels by the addition of about 0.001 to 10.0% by weight of the compound to the oil or fuel contemplated. The preferred range is about 0.005 to 2.0% by weight. For lubricant formulations, the compounds of the present invention are used in the amounts of 0.1 to 10.0%, preferably 0.2 to 2.0%, by weight. In fuels, the range is 0.001 to 0.1%, preferably 0.005 to 0.05%, by weight. The polymers of the present invention, with their rigidly restricted component parts, possess a surprisingly advantageous combination of the desired properties of solubility in the oils and fuels contemplated, substantial insolubility in water and a high degree of effectiveness as anti-rust, anti-wear and ignition control additives. The present compounds are also highly advantageous in that when incorporated in gasoline, which is stored over alkaline water, there is no leaching of the additive into the water layer. This is in contrast to amine salts of phosphorus containing acids which characteristically split and dissolve in the water layer and thereby minimize and sometimes substantially eliminate any advantages that might otherwise be achieved.

As will be clearly understood in the art, the distillate fuels contemplated are those that boil from 75° to 750° F. which includes gasolines, along with jet and diesel fuels and furnace oils. The present compounds are particularly useful in fuels that boil up to about 600° F., that is, the normal gasolines and jet fuels. The need for an additive to supply all the aforementioned qualities is widely recognized in the art, since the presence of rust, water, stalling or preignition properties and combinations thereof in oils and fuels leads to a marked diminution of the value of such lubricating oils or fuels.

The lubricating compositions of the present invention possess advanced combinations of the desired properties of solubility in the oils contemplated, a high degree of effectiveness as anti-rust, dispersant, pour-point depressant and viscosity improvement agents.

While the copolymers of the present invention have been set forth as the result of a specific aminomethane phosphonate, with one or more of the defined comonomers, it is possible to copolymerize one of the defined monomers with the compound of the Formula III and then react the resulting copolymer with the compounds of the Formulas II and IV. It is to be construed for the purposes of this invention, that all of these variations are contemplated and included. The important thing is that the final copolymer be made up of the groups inherent in the defined aminomethane phosphonate and the defined comonomers.

The process of the present invention may be more fully understood from the following examples which are offered by way of illustration and not by way of limitation. Parts by weight are used throughout.

*Example 1*

A 1000 cc. round-bottom, 3-neck flask is equipped with a gas inlet tube, a condenser and a semi-circular glass stirrer. The system is flushed with nitrogen and the oil bath surrounding the reaction flask is maintained at an initial temperature of 130° C. There is added to the flask a mixture consisting of 300 parts of lauryl-myristyl methacrylate, 40 parts of toluene and 0.68 part of tert-butyl perbenzoate (85% active ingredient as supplied commercially). The lauryl-myristyl methacrylate is the methacrylic ester prepared from a commercial alcohol containing 4% decanol, 66.4% dodecanol, 27.2% tetradecanol and 2.4% hexadecanol. The bath temperature is maintained at 120° to 130° C. for 1.67 hours when a second monomer mixture consisting of 60 parts of lauryl-myristyl methacrylate, 40 parts of tert-butylaminoethyl methacrylate and 0.21 part of tert-butylperbenzoate (85% active ingredient as supplied commercially) is added to the flask. Additions of 1.16 parts of tert-butylperbenzoate (10% active ingredient) dissolved in 20 parts of toluene are made at 3.67, 5.67, 6.33 and 7.00 hours, respectively. An addition of 1.74 parts of this same catalyst solution dissolved in 20 parts of toluene is made at 5.00 hours. Toluene (100 parts) is added to the reaction mixture at 7.50 hours when the reaction is considered to be complete. The resulting toluene solution is 52.0% of copolymer, representing a polymer yield of 82%.

A sample of the above 52% copolymer (179 parts) is further diluted with 150 parts of toluene. Aqueous formaldehyde (4.05 parts of 37% concentration/.05 m.) is added dropwise during 30 minutes with good stirring. The mixture is heated to 40° C. for 30 to 40 minutes. Dimethyl phosphite (5.5 parts, 0.05 m.) is then added during 30 minutes. The reaction is completed by heating at 40° C. for 1 hour. The water from the aqueous formaldehyde and from the reaction is removed by azeotropic distillation with toluene under reduced pressure (30 to 50 mm.). The reaction mixture is kept at about 35° to 40° C. during the drying step. Solvent is removed giving a final weight of 237 parts of copolymer corresponding to 41.5% solids.

*Example 2*

The apparatus described in Example 1 is used to prepare the following polymer. A monomer mixture is prepared containing 360 parts of lauryl-myristyl methacrylate, 40 parts of tert-butylaminoethyl methacrylate, 40 parts of toluene and 0.68 part of tert-butylperbenzoate (85% active ingredient as supplied commercially). All of this monomer mixture is added to the flask and the identical polymerization procedure described in Example 1 is used in the preparation of this copolymer. The resulting toluene solution is 51.7% of copolymer representing a polymer yield of 82.5%.

A sample of the above 51.7% copolymer solution (179 parts is further diluted with 150 parts of toluene. Aqueous formaldehyde (4.05 parts of 37% concentration/.05 mm.) is added dropwise during 30 minutes with good stirring. The mixture is heated to 40° C. for 30 to 40 minutes. Dimethyl phosphite (5.5 parts, 0.05 m.) is then added during 30 minutes. The reaction is completed by heating at 40° C. for 1 hour. The water from the aqueous formaldehyde and from the reaction is removed by azeotropic distillation with toluene under reduced pressure (30 to 50 mm.). The reaction mixture is kept at about 35° to 40° C. during the drying step. Solvent is removed giving a final weight of 237 parts of copolymer corresponding to 41.5% solids.

*Example 3*

A 5000 cc. round-bottom, 3-neck flask is equipped with a gas inlet tube, a condenser, a semi-circular glass stirrer and a thermometer. The system is flushed with nitrogen and a 5000 cc. controlled heating mantle is raised around the flask. A monomer mixture is prepared from 1367 parts of lauryl-myristyl methacrylate (98.8% purity), 150 parts of tert-butylaminoethyl methacrylate, 150 parts of toluene and 6 parts of azo-bis-isobutyronitrile. Thirty percent of this monomer mixture is added to the flask and when the batch temperature reaches 70° C., the time is considered 0.00 hour. Polymerization occurs within 0.17 hour, an exotherm raising the temperature to 132° C. The reaction mixture is cooled with an ice-water bath. After 0.33 hour, the balance of the monomer mixture is added uniformly over the next 1.67 hours with all the monomer mixture in the flask at 2.00 hours. The temperature is maintained at 90° to 100° C. during the entire polymerization cycle. Additions of 0.6 part of α,α′-azo-diisobutyrontrile in 10.0 parts of toluene are made at 2.67, 3.33, 4.00, 4.67 and 5.33 hours, respectively. Toluene (200 parts) is added to the reaction mixture at 6.00 hours and heating of the mixture is continued until 7.00 hours when the reaction is considered complete. The resulting toluene solution is 69.5% of copolymer, representing a polymer yield of 88.0%.

A sample of the copolymer solution is further diluted with toluene to give a 44.2% solution of copolymer. To this solution (1360 parts, equivalent to 600 parts of copolymer) are added 11.85 parts of paraformaldehyde (92% purity) and 40.6 parts of dimethyl phosphite. The mixture is heated at reflux for 3 hours. The water (10.3 parts), present with the formaldehyde and that formed during the reaction, is removed as an azeotropic mixture with toluene. The final solution (1336 parts) is determined to be a 48.7% solution of lauryl-myristyl methacrylate/O,O - dimethyl - N - methacryloxyethyl - N - tert-butylaminomethane phosphonate copolymer.

A sample of the above copolymer is stripped into a 170 solvent extracted neutral oil at 120° C. for 1 hour at a pressure of 1 to 2 mm. of mercury to give a 25% solution of copolymer with a viscosity of 255 cs. at 210° F.

*Example 4*

A 500 cc. flask is equipped as described in Example 1. A monomeric mixture is prepared from 180 parts of lauryl-myristyl methacrylate, 20 parts of tridecylaminoethyl methacrylate, 10 parts of toluene and 0.6 part of α,α'-azodiisobutyronitrile. Thirty percent of this monomer mixture is added to the flask and when the bath temperature reaches 45° C., the time is considered 0.00 hour. At 0.33 hour with the batch temperature at 70° C., the addition of the monomer mixture is begun and continued uniformly over 1.67 hours. An exotherm occurs at 0.67 hour which raises the temperature at 95° C. All the monomer mixture is added to the flask at 2.00 hours and additions of 0.06 part of α,α'-azodiisobutyronitrile in 25 parts of toluene are made at 2.67, 3.33, 4.00, 4.67 and 5.33 hours, respectively. The batch temperature is maintained at 77° to 92° C. until 4.67 hours when it is decreased to 68° C. for the remainder of the polymerization. Toluene (50.0 parts) is added to the reaction mixture at 6.00 hours and heating is continued until 6.50 hours when the reaction is considered complete. The resulting toluene solution is 49.8% copolymer, representing a polymer yield of 88.3%.

A sample of the above copolymer solution is further diluted with toluene to give a 47.0% solution of copolymer. To this solution (159.4 parts), equivalent to 75 parts of copolymer, is added 0.399 part of paraformaldehyde, 1.463 parts of dimethyl phosphite and 50 parts of benzene. The mixture is heated at reflux for 3 hours and the water present with the formaldehyde and formed during the reaction is removed as an azeotropic mixture with the toluene and benzene. The final solution is determined to be 34.8% solution of lauryl-myristyl methacrylate/O,O - dimethyl - N - methacryloxyethyl-N-tridecylaminomethane phosphonate copolymer.

A sample of the above copolymer is stripped into a 170 solvent extracted neutral oil at 110° C. for 1 hour at a pressure of 1 to 2 mm. of mercury to give a 25% solution of copolymer with a viscosity of 757 cs. at 210° F.

In a similar way, a copolymer of this invention is formed using equivalent amounts of diphenyl phosphite.

*Example 5*

A 1000 cc. flask is equipped as described in Example 1. A monomeric mixture is prepared from 240 parts of lauryl-myristyl methacrylate, 60 parts of tert-butylaminoethyl methacrylate, 24 parts of toluene and 6 parts of tert-butylperbenzoate (10% active ingredient). Thirty percent of this monomer mixture is added to the flask. When the batch temperature reaches 125° C., the time is considered 0.00 hour. At 0.33 hour, with the batch temperature at 121° C., the addition of the balance of the monomer mixture is begun and continued uniformly over 1.67 hours. After all the monomer mixture is added to the flask, at 2.00 hours, additions of 1.2 parts of tert-butylperbenzoate (10% active ingredient) in toluene (10.0 parts in the first three additions and 20.0 parts in the final two additions) are made at 3.00, 3.67, 4.33, 5.00 and 5.67 hours, respectively. The batch temperature is maintained at 121° to 125° C. throughout the polymerization. Toluene (50 parts) is added to the reaction mixture at 6.33 hours. Heating is continued until 7.33 hours when the reaction is considered complete. The resulting toluene solution is 50.2% copolymer, representing a polymer yield of 72.4%.

A sample of the above copolymeric solution is further diluted with toluene to give a 30% solution of copolymer. To this solution (334 parts), equivalent to 100.2 parts of copolymer, are added 3.52 parts of paraformaldehyde (92% purity, equivalent to 3.24 parts of formaldehyde), 11.7 parts of dimethyl phosphite and 146 parts of toluene. The mixture is heated at reflux for 2.50 hours and the water present with the formaldehyde and formed during the reaction is recovered as an azeotropic mixture with the toluene. The final solution is determined to be 25.9% solution of lauryl-myristyl methacrylate/O,O-dimethyl-N-methacryloxyethyl - N - tert-butylaminomethane phosphonate copolymer.

A sample of the above copolymer is stripped into a 170 solvent extracted neutral oil at 70° C. for 1 hour at a pressure of 0.1 mm. of mercury to give a 25% solution of copolymer with a viscosity of 180 cs. at 210° F.

Similarly, a copolymer is prepared employing equivalent amounts of di(chlorohexyl)phosphite.

*Example 6*

A 2000 cc. flask is equipped as described in Example 1. A 2000 cc. heating mantle is used in place of the oil bath to supply external heat. A monomer mixture is prepared from 469 parts of lauryl-myristyl methacrylate (95.8% purity), 50 parts of tert-butylaminoethyl methacrylate, 25 parts of toluene and 1.5 parts of α,α'-azodiisobutyronitrile. Thirty percent of this monomer mixture is added to the flask and the time is considered 0.00 hour with the batch temperature at 38° C. At 0.33 hour with the batch temperature at 64° C., the addition of the balance of the monomer mixture is begun and continued uniformly over 1.67 hours. After all the monomer mixture has been added to the flask at 2.00 hours, additions of 0.04 part of α,α'-azodiisobutyronitrile in toluene (10.0 parts in first addition, 5.0 parts in second and third additions, 15.0 parts in fourth addition and 25.0 parts in fifth addition) are made at 2.67, 3.33, 4.00, 4.67 and 5.33 hours, respectively. The batch temperature is maintained at 60° to 70° C. (two exotherms occurred causing the temperature to rise to 76° to 80° C. at 2.67 and 4.50 hours) throughout the polymerization. Toluene (100 parts) is added at 6.00 hours, 0.75 part of α,α'-azodiisobutyronitrile is added at 6.50 hours and the reaction is continued until 23.00 hours when 300 parts of toluene is added and the reaction considered complete. The resulting toluene solution is 45.9% copolymer representing a polymer yield of 87.5%.

A mixture is prepared from 207 parts of a 48.4% toluene solution of the above copolymer, representing 100 parts of copolymer, 13 parts of bis(2-chloroethyl) hydrogen phosphite, 1.9 parts of pure formaldehyde and 50 parts of benzene. The mixture is heated at reflux for 2.00 hours and the water present with the formaldehyde and formed during the reaction is removed as an azeotropic mixture with the toluene and benzene. The final solution is determined to be 28.7% of copolymer lauryl-myristyl methacrylate/O,O - di - 2 - chloroethyl-N-methacryloxyethyl - N - tert - butylaminomethane phosphonate.

A sample of the above copolymer is stripped into a 170 solvent extracted neutral oil at 110° to 120° C. for 1 hour at a pressure of 1 to 2 mm. of mercury.

In like manner, a copolymer of this invention is prepared using equivalent amounts of dibenzyl phosphite.

Example 7

A 1000 cc. flask is equipped as described in Example 1. A monomer mixture is prepared from 180 parts lauryl-myristyl methacrylate, 20 parts of tert-butylaminoethyl methacrylate, 10 parts of toluene and 0.6 part of α,α'-azodiisobutyronitrile. Ten percent of the monomer mixture is added to the flask and the time is considered 0.00 hour with the batch temperature at 40° C. After 0.33 hour, the addition of the balance of the monomer mixture is begun and continued uniformly during 5.67 hours, such that all the monomer mixture is added to the flask at 6.00 hours. The temperature is maintained at 85° to 95° C. throughout the addition of the monomer mixture and for the balance of the polymerization cycle. At 6.00 hours, 0.3 part of α,α'-azodiisobutyronitrile in 30 parts of toluene is added to the reaction mixture and heating is continued during the night and terminated the following morning at 23 hours when polymerization is considered complete. Toluene (200 parts) is added to the mixture and the resulting solution is 46.0% copolymer representing a polymer yield of 90.3%.

A mixture is prepared from 221.0 parts of a 39.8% toluene solution of the above copolymer, representing 88.0 parts of copolymer, 6.61 parts of di-(2-ethylhexyl) phosphite, 0.648 part of paraformaldehyde and 50.0 parts of benzene. The mixture is heated at reflux for 3.0 hours and the water present with the formaldehyde and formed during the reaction is removed as an azeotropic mixture with the toluene and benzene. The final solution is 40.9% copolymer lauryl-myristyl methacrylate/O,O-di-(2-ethylhexyl) - N-methacryloxyethyl-N-tert-butylaminomethane phosphonate.

A sample of the above copolymer is stripped into a 170 solvent extracted neutral oil at 110° C. for 1 hour at a pressure of 1 mm. of mercury to give a 25% solution of copolymer with a viscosity of 677 cs. at 210° F.

Example 8

The copolymerization is carried out in a 500 cc., 3-neck flask equipped with semi-circular stirrer, dropping funnel, condenser, gas-inlet tube and electrically heated oil bath. The following monomeric mixture is charged to the flask during 110 minutes, using a nitrogen atmosphere and maintaining a bath temperature of 115° C.

| | Parts |
|---|---|
| Stearyl acrylate | 4.5 |
| Isodecyl acrylate | 4.5 |
| Tert-butylaminoethyl acrylate | 1.0 |
| Toluene | 2.5 |
| Benzoyl peroxide | 0.02 |

The bath temperature ranges from 112° to 115° C. for 3 hours, then it is lowered and maintained at 103° to 105° C. the remainder of the heating cycle for a total of 8 hours. Incremental additions of benzoyl peroxide and of toluene charged during the course of the copolymerization total 0.04 and 7.0 parts, respectively. At 7.75 hours, the batch is diluted with 6.7 parts additional toluene and at 8 hours, heating is terminated. The net weight of the batch is found to be 28.1 parts. Analysis shows the solution to contain 33.9% of copolymer. A toluene solution, 30% copolymer, has a viscosity of 358 cs. at 100° F.

To 31.7 parts of toluene solution containing 9.52 parts of copolymer are added 0.19 part of formaldehyde as paraformaldehyde (92% purity) and 0.77 part of diethyl phosphite. The mixture is heated at reflux for 3 hours and the water removed as an azeotropic mixture with toluene. The final solution is a 32% solution of stearyl acrylate/isodecyl acrylate/O,O - diethyl - N-acryloxyethyl-N-tert-butylaminomethane phosphonate copolymer.

The above copolymer is stripped into 150 SUS neutral oil at 105° C. and 10 to 15 mm. pressure to give a 25% solution of the copolymer.

Example 9

The apparatus and procedure described in Example 3 are used in the copolymerization of the following catalyzed monomer mixture:

| | Parts |
|---|---|
| Di-(lauryl-myristyl)fumarate (made from a commercially available alcohol containing 4% decanol, 66.4% dodecanol, 27.2% tetradecanol and 2.4% hexadecanol) | 700 |
| Toluene | 200 |
| Vinyl acetate | 200 |
| Tert-butylaminoethyl methacrylate | 100 |
| α,α'-Azodiisobutyronitrile | 10 |

An addition of 2 parts of α,α'-azodiisobutyronitrile is made at 3.7 hours. Additions of 3 parts of α,α'-azodiisobutyronitrile are made at 5, 5.7, 6.3 and 7 hours, respectively. Heating is stopped at 8 hours. The resulting toluene solution is 77% copolymer.

To a reaction flask are charged 780 parts of the 77% solution of copolymer, 11.85 parts of paraformaldehyde (92% purity-equivalent to 10.9 parts 100% material) and 40.6 parts of dimethyl phosphite. This mixture is heated under reflux to remove the water azeotropically. The final solution is a 78% solution of di-(lauryl-myristyl)fumarate/vinyl acetate/O,O - dimethyl-N-methacryloxyethyl-N-tert-butylaminomethane phosphonate copolymer.

To a stripping flask are charged 20 parts of the 78% copolymer solution and 36 parts of 100 SUS neutral oil. This mixture is stirred and heated to 130° C. under 10 mm. of mercury for 1 hour to give 51.5 parts of final product. This solution is 30% of copolymer and shows a viscosity of 15 cs. at 210° F.

One percent of this copolymer in a 100 SUS neutral oil (with viscosities of 4.06 cs. at 210° F. and 21.23 cs. at 100° F.) gives a viscosity index of 101 (viscosities of 4.20 cs. at 210° F. and 22.22 cs. at 100° F.).

Example 10

A 500 cc. flask is fitted as for Example 8. The following catalyzed monomeric mixture is prepared consisting of 45 parts of vinyl stearate, 45 parts of vinyl butyrate, 10 parts of tert-butylaminoethyl methacrylate, 10 parts of toluene and 1 part of α,α'-azodiisobutyronitrile. Thirty percent of the catalyzed monomeric mixture is charged to the flask. The time is considered 0 hour when the batch temperature reaches 85° C. This temperature is maintained during the entire copolymerization process. After 0.33 hour, the remaining catalyzed monomeric mixture is added to the reaction flask over 1.67 hours. An addition of 0.2 part α,α'-azodiisobutyronitrile is made at 2.67 hours. Additions of 0.3 part α,α'-azodiisobutyronitrile are made at 4, 4.67, 5.3 and 6 hours, respectively. Heating is stopped at 7 hours. After dilution with 22 parts of toluene, the resulting solution is 55% of copolymer.

To 17.3 parts of the 55% solution is charged 0.2 part of paraformaldehyde (92% purity) and 0.77 part of diethyl phosphite. This mixture is heated under reflux for 3.3 hours and the water is removed as an azeotropic mixture with toluene. The final solution is determined to be a 56.7% solution of a copolymer of vinyl stearate/vinyl butyrate/O,O-diethyl-N-methacryloxyethyl-N-tert - butylaminomethane phosphonate.

To a stripping flask is charged 29.1 parts of the 56.7% solution of the product with 34.6 parts of 170 SUS neutral oil. This mixture is heated with stirring to 105° C. at 15 mm. pressure for 1 hour to give 55.2 parts of final product. This solution is 30% polymer and shows a viscosity of 41 cs. at 210° F.

One percent of this copolymer in 100 SUS neutral oil (as described in preceding Example 9) gives a viscosity of 4.39 cs. at 210° F. and 22.85 cs. at 100° F. to show a viscosity index of 114.

A similar copolymer is prepared by employing equivalent amounts of di-(chlorophenyl)phosphite.

Example 11

Other monomers, such as dimethylaminoethyl methacrylate, 2-vinylpyridine, 2-methyl-5-vinylpyridine, N-vinyl-2-pyrrolidinone, N-vinyl-2-oxazolidone, N-vinyl - 3 - morpholinone, N-vinyl-5-methyl-2-oxazolidone, N-(2 - methacryloxyalkyl)-2-pyrrolidone, N-(2-acryloxyalkyl)-2-oxazolidone, N,N-dialkylmethacrylamides or acrylamides, such as N,N-dimethylacrylamide, N-alkylacrylamides, such as N-butylacrylamide, N-(dimethylaminoethyl)-methacrylamide, N-alkylmaleimides, such as N-methylmaleimide, N-vinylsuccinimide, vinyl alkyl ethers, vinyl alkyl sulfides, allyl esters, styrene and monoalkyl or alkaryl ethers of polyethylene glycol acrylate or methacrylate, are incorporated into the copolymer in minor amounts. For instance, a 500 cc. polymerization vessel is fitted as described in Example 8. A catalyzed monomeric mixture is prepared from 27 parts of cetyl-stearyl methacrylate (made from a commercially available alcohol containing 2% tetradecanol, 30% hexadecanol and 68% octadecanol), 50 parts of lauryl-myristyl methacrylate, 10 parts of n-butyl methacrylate, 5 parts of toluene and 0.7 part $\alpha,\alpha'$-azodiisobutyronitrile. Thirty percent of this catalyzed monomeric mixture is added to the polymerization flask which is flushed with nitrogen. The time is considered 0 hours when the batch temperature reaches 85° C. This temperature is maintained during the copolymerization process except at 0.17 hour when an exotherm carries the batch temperature to 105° C. After 0.33 hour, the remaining catalyzed mixture is added to the flask during 1.67 hours. Another catalyzed monomeric mixture is prepared consisting of:

| | Parts |
|---|---|
| 2-methyl-5-vinylpyridine | 3 |
| Tert-butylaminoethyl methacrylate | 10 |
| Toluene | 20 |
| $\alpha,\alpha'$-azodiisobutyronitrile | 0.3 |

This second catalyzed monomeric mixture is added to the polymerization flask from 2.25 hours until 3.00 hours. An addition of 0.1 part of $\alpha,\alpha'$-azodiisobutyronitrile in 5 parts of toluene is made at 3.67 hours. An addition of 0.2 part of $\alpha,\alpha'$-azodiisobutyronitrile in 5 parts of toluene is made at 5 hours. Additions of 0.2 part of $\alpha,\alpha'$-azodiisobutyronitrile in 5 parts of toluene are made at 5.67, 6.3 and 7.0 hours, respectively. At 8 hours, 50 parts of toluene is added. Heating is stopped at 8.5 hours. The toluene solution shows 44% of copolymer on analysis.

A mixture is prepared from the above solution, 1.76 parts of paraformaldehyde (92% purity) and 7.45 parts of diethyl phosphite. This mixture is heated at reflux for 3 hours to remove the azeotropic mixture of water and toluene. The final solution is 46% copolymer of cetyl-stearyl methacrylate/lauryl-myristyl methacrylate/n - butyl methacrylate/2-methyl-5-vinylpyridine/O,O-diethyl-N-methacryloxyethyl-N - tert - butylaminomethane phosphonate.

A sample of the above copolymer is stripped into 150 SUS neutral oil at 110° C. for 1 hour at a pressure of 3 mm. of mercury to give a 40% solution of copolymer with a viscosity of 340 cs. at 210° F.

Example 12

A 1000 cc. round-bottom, 3-neck flask is equipped with a gas inlet tube, a condenser and a semi-circular glass stirrer. The system is flushed with nitrogen and the oil bath surrounding the reaction flask is maintained at an initial temperature of 113° C. There is added to the flask a mixture consisting of 190.0 parts of cetyl-stearyl methacrylate, 10.0 parts of tert-butylaminoethyl methacrylate, 20.0 parts of toluene and 0.4 part of $\alpha,\alpha'$-azodiisobutyronitrile. The batch temperature is maintained at 107° to 113° C. during the entire polymerization cycle. Additions of 0.04 part of $\alpha,\alpha'$-azodiisobutyronitrile in 25.0 parts of toluene are made at 2.67, 3.33, 4.00, 4.67 and 5.33 hours. Toluene (50.0 parts) is added to the reaction mixture at 6.00 hours and the batch is removed at 6.50 hours when the reaction is considered complete. The resulting toluene solution is 45.9% of copolymer, representing a polymer yield of 85.3%.

A sample is stripped of unreacted monomer and redissolved in toluene to give a 56.9% solution of copolymer. To 126.5 parts of this solution of copolymer (equivalent to 72.0 parts of copolymer) are added 0.339 part of paraformaldehyde (92% purity), 1.29 parts of dimethyl phosphite and 50.0 parts of benzene. The mixture is heated at 130° C. for 4.0 hours and a very small amount of water is removed as an azeotropic mixture with benzene and toluene. The final solution is arranged for distillation and heated at 135° C. for 1 hour at 0.3 mm. of mercury. The residue is redissolved in toluene to give a 29.8% solution of cetyl-stearyl methacrylate/O,O - dimethyl - N - methacryloxyethyl - N - tert - butylaminomethane phosphonate copolymer.

Example 13

A 500 cc. round-bottom, 3-neck flask is equipped with an additional funnel, a gas inlet tube, a catalyst inlet tube, a bulb reflux condenser, a thermometer and a glass semi-circular stirrer. The reaction is carried out under a blanket of nitorgen and the temperature is maintained by a controlled, electrically heated oil bath.

The following monomer mixture is prepared consisting of 35.0 parts tert-tridecylaminoethyl methacrylate, 15.0 parts methyl methacrylate and 20.0 parts toluene. A catalyst solution of 0.125 part $\alpha,\alpha'$-azodiisobutyronitrile in 2.375 parts of chloroform is prepared. Thirty percent of the monomer mixture and 10% of the catalyst solution are charged to the reaction flask and are heated to 100° C. The temperature is maintained at 100° C.±5° C. for the polymerization cycle. The time is considered 0.00 hours when the temperature reaches 100° C. After 0.25 hours, the rest of the monomer mixture is added to the reaction flask in 10 shots at 10 minute intervals. At 2.50 hours, 17.37 parts of toluene is added. At 4.00 hours, 50.0 parts of toluene is added. The reaction is stopped at 4.67 hours. The resulting solution is 35.0% solids representing an 89.2% copolymerization yield.

A sample of the above copolymer solution (95 parts) is further diluted with 100 parts of toluene. Pulverized paraformaldehyde (2.57 parts) and dimethyl phosphite (8.55 parts) are added. The mixture is heated at reflux and the water (1.8 parts) present with the formaldehyde and formed during the reaction is removed as an azeotropic mixture with toluene. Traces of unreacted formaldehyde are removed by filtration. The final weight of the mixture is 172 parts corresponding to a 20% solution of O,O - dimethyl-N-methacryloxyethyl-N-tridecylaminomethane phosphonate/methyl methacrylate copolymer.

Example 14

To a 2-liter polymerization vessel fitted with an inlet tube for nitrogen gas, reflux condenser, thermometer, dropping funnel, semi-circular glass stirrer operated at about 160 r.p.m. and electrically heated oil bath is charged 700 parts of toluene which is blanketed with nitrogen and heated to 80° to 95° C. Over a period of 2 hours, there is charged gradually a monomer mixture consisting of:

350 parts of tert-butylaminoethyl methacrylate
350 parts of methyl methacrylate
3 parts of $\alpha,\alpha'$-azodiisobutyronitrile.

After 6 hours at 95° C., the batch weighs 1,353 gms. It analyzes 49.7% of copolymer representing a 96.1% yield of copolymer. The Brookfield viscosity of this product at 30° C. is 4,500 centipoises. At 40%, the Brookfield viscosity is 425 centipoises.

Two hundred parts of the polymer solution is diluted with 400 parts of toluene. Aqueous formaldehyde (17.5 parts of 37%; 0.216 m.) is added dropwise with efficient stirring. The temperature rises from about 25° to about 32° C. during the addition. Dimethyl phosphite (23.7 parts, 0.216 m.) is added during the next 15 minutes and the mixture is stirred for 2 hours at room temperature. Toluene is then removed under aspirator vacuum (30 to 50 minutes) while keeping the reaction mixture at about 35° C. The solution becomes clean as the water is removed along with the solvent. Toluene is removed until the final weight of the solution is 355 parts corresponding to a 30% solution of a copolymer of methyl methacrylate and O,O - dimethyl - N - methacryloxyethyl-N-tert-butyl-aminomethane phosphonate.

*Example 15*

A 5000 cc. flask is equipped as described in Example 3. A mixture consisting of 1350 parts of tridecyl methacrylate, 75 parts of tert-butylminoethyl methacrylate, 97.8 parts of tert-octylaminoethyl methacrylate, 150 parts of toluene and 6 parts of azobisisobutyronitrile is copolymerized in the same manner as described in Example 3. The resulting toluene solution analyzes 71.3% solids, representing a 90% copolymer yield.

To 854 parts of this toluene solution, equivalent to 609 parts of copolymer, are added 523 parts of toluene, 11.85 parts of paraformaldehyde (92% purity) and 40.6 parts of dimethyl phosphite. Heating and stirring are carried out to remove the water formed during the reaction. There results 1416 parts of solution, 45.7% of copolymer of tridecyl methacrylate/O,O-dimethyl-N-methacryloxyethyl-N-tert-butylaminomethane phosphonate with O,O-dimethyl-N-methacryloxyethyl-N-tert-octylaminomethane phosphonate.

On stripping this copolymer in 170 solvent extracted neutral oil at 120° C. for 1 hour under reduced pressure of 5 mm., a polymeric solution is obtained which shows the copolymer to be oil soluble.

*Example 16*

A mixture of 742.5 parts of isodecyl methacrylate, 607.5 parts of cetyl-stearyl methacrylate, 75 parts of tert-butylaminoethyl methacrylate and 97.8 parts of tert-octylaminoethyl methacrylate is allowed to copolymerize in toluene exactly as described in Example 3 except that 0.23 part of n-dodecyl mercaptan is employed as a chain regulator. The yield of copolymer is 1370 parts.

To 854 parts of the toluene solution, representing 609 parts of the copolymer, are added 523 parts of toluene, 11.85 parts of paraformaldehyde (92% purity) and 40.6 parts of dimethyl phosphite. Heating and stirring effect removal of water to give 1412 parts of solution of copolymer. This solution, 45.8% of copolymer of isodecyl methacrylate: cetyl-stearyl methacrylate/O,O-dimethyl-N - methacryloxyethyl-N-tert - butylaminomethane phosphonate: O,O-dimethyl - N - methacryloxyethyl - N - tert-octylaminomethane phosphate, is very oil soluble.

The isodecyl alcohol used in the synthesis of isodecyl methacrylate is an oxo alcohol, whereas the cetyl-stearyl alcohol used in making the cetyl-stearyl methacrylate is 51.4% stearyl alcohol, 41.4% cetyl alcohol, with 7.2% lower mixed alcohols of n-octanol, n-decanol, n-dodecanol and n-tetradecanol.

We claim:

1. A composition selected from the class consisting of a lubricating oil and a liquid hydrocarbon fuel having incorporated therein a minor amount sufficient to impart detergency of a soluble copolymer, having a molecular weight of at least about 20,000 and up to about 2,000,000, consisting essentially of the monomers (a) and (b) which must be limited to those said monomers which impart oil solubility to the resulting said copolymer, where said (a) is between about 90 and 99.5% by weight principally of at least one monoethylenically unsaturated polymerizable monomer selected from the class consisting of alkyl $(C_1-C_{18})$ methacrylate, alkyl $(C_1-C_{18})$ acrylate, dialkyl $(C_1-C_{18})$ fumarate, dialkyl $(C_1-C_{18})$ maleate, dialkyl $(C_1-C_{18})$ itaconate and vinyl esters of monocarboxylic acids, and said (b) is between about 10 and 0.5% by weight of at least one monomer having the formula

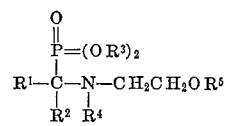

in which $R^1$ and $R^2$ are members of the class consisting of hydrogen and alkyl of 1 to 8 carbon atoms, $R^3$ is a member of the class consisting of alkyl of 1 to 8 carbon atoms, chloroalkyl of 1 to 8 carbon atoms, phenyl, chlorophenyl, benzyl and chlorobenzyl, $R^4$ is a member of the class consisting of hydrogen and a tert-alkyl group of 4 to 24 carbon atoms and $R^5$ is a member of the class consisting of vinyl, acryloyl and methacryloyl.

2. A composition according to claim 1 in which there is incorporated in the lubricant at least 0.1% by weight of said copolymer.

3. A composition according to claim 1 in which there is incorporated in said fuel at least 0.001% by weight of said copolymer.

4. A composition according to claim 1 in which there is employed at least 2% by weight and up to about 10% by weight of said (b) in the copolymer, in which there are employed in said (a) minor proportions of monomers selected from the class consisting of acrylic acid, methacrylic acid, itaconic acid, maleic anhydride, acrylamide, methacrylamide, acrylonitrile, methacrylonitrile, vinyl ethers, vinyl thioethers, vinyl chloride, vinylidene chloride and styrene.

5. A composition according to claim 1 in which
$R^1$ and $R^2$ are hydrogen,
$R^3$ is alkyl of 1 to 8 carbon atoms,
$R^4$ is tert-dodecyl, and
$R^5$ is methacryloyl.

6. A composition according to claim 1 in which
$R^1$ and $R^2$ are hydrogen,
$R^3$ is alkyl of 1 to 8 carbon atoms,
$R^4$ is tert-tridecyl, and
$R^5$ is methacryloyl.

7. A composition according to claim 1 in which
$R^1$ and $R^2$ are hydrogen,
$R^3$ is alkyl of 1 to 8 carbon atoms,
$R^4$ is tert-octadecyl, and
$R^5$ is methacryloyl.

8. A composition according to claim 5 in which said (a) monomer is an alkyl $(C_1-C_{18})$ methacrylate.

9. A composition according to claim 5 in which said (a) monomer is an alkyl $(C_1-C_{18})$ acrylate.

10. A composition according to claim 5 in which said (a) monomer is a dialkyl $(C_1-C_{18})$ fumarate.

11. A composition according to claim 5 in which said (a) monomer is a dialkyl $(C_1-C_{18})$ maleate.

12. A composition according to claim 5 in which said (a) monomer is a dialkyl $(C_1-C_{18})$ itaconate.

13. A composition according to claim 6 in which said (a) monomer is an alkyl ($C_1$–$C_{18}$) methacrylate.

14. A composition according to claim 6 in which said (a) monomer is an alkyl ($C_1$–$C_{18}$) acrylate.

15. A composition according to claim 6 in which said (a) monomer is a dialkyl ($C_1$–$C_{18}$) fumarate.

16. A composition according to claim 6 in which said (a) monomer is a dialkyl ($C_1$–$C_{18}$) maleate.

17. A composition according to claim 6 in which said (a) monomer is a dialkyl ($C_1$–$C_{18}$) itaconate.

18. A composition according to claim 7 in which said (a) monomer is an alkyl ($C_1$–$C_{18}$) methacrylate.

References Cited by the Examiner

UNITED STATES PATENTS

| 2,737,452 | 3/1956 | Catlin et al. | 44—62 |
| 2,847,442 | 8/1958 | Sallmann | 252—49.9 X |
| 3,012,055 | 12/1961 | Pollitzer | 44—71 X |

References Cited by the Applicant

UNITED STATES PATENTS 3,175,998   3/1965   Rabinowitz.

DANIEL E. WYMAN, *Primary Examiner.*

P. P. GARVIN, *Assistant Examiner.*